UNITED STATES PATENT OFFICE.

JACOB S. ROBESON, OF PENNINGTON, NEW JERSEY.

MANUFACTURE OF DYESTUFFS.

1,316,742.  Specification of Letters Patent. Patented Sept. 23, 1919.

No Drawing.  Application filed April 25, 1916.  Serial No. 93,474.

*To all whom it may concern:*

Be it known that I, JACOB S. ROBESON, a citizen of the United States, residing at Pennington, in the county of Mercer and State of New Jersey, have invented certain new and useful Improvements in the Manufacture of Dyestuffs, of which the following is a specification.

This invention relates to the manufacture of dyestuffs; and it comprises a method of producing dyestuffs of the class known as sulfur dyes wherein a heavy metal or an earth metal derivative of the characteristic organic matters of sulfite waste liquor is heated with an alkaline sulfid in the presence of sufficient sulfur and it also comprises as a new dyestuff, a sulfur dye containing a heavy metal (that is a compound of one of the common heavy metals) and derivatives of the characteristic organic matters of sulfite waste liquor, such dyestuff being a gray black powder, soluble in water, and directly dyeing cotton and other vegetable fibers brown or black; all as more fully hereinafter set forth and as claimed.

In the manufacture of paper one of the common methods is digestion of the wood with a solution of an acid sulfite; generally acid sulfite or calcium (bisulfite of lime) though a solution containing acid sulfites of calcium and of magnesium is sometimes used where dolomitic lime is used for making the sulfite liquor. About half the organic matter of the wood goes into solution, uniting with the sulfur and bases present to form complex new bodies. For the sake of a name, the portion of the wood which goes into solution is usually called "lignone;" and the complex new bodies are termed "lignosulfonates" in the art; lignosulfonate of calcium for example. It is material containing these characteristic organic components of sulfite waste liquor that I use in the present invention.

In the art, sulfite waste liquor is ordinarily neutralized with lime and evaporated to make commercial products; these commercial products ranging from a thick viscous liquid of 30° Baumé to a semi-solid or dry solid material. It is a concentrated product of this nature which I advantageously use in the present invention although the original or unconcentrated sulfite waste liquor may also be used.

On mixing sulfite liquor or its dried or concentrated preparations with sulfur and sodium sulfid and fusing the mixture, dyestuffs can be made which will color cotton black. I have found however that much better materials having better dyeing properties and yielding a better color may be made by substituting for the lime in the sulfite liquor another and non-alkaline base; this base being best one of the heavy metal bases, although an earth metal base, such as alumina, may be used.

As stated, the characteristic organic matters of the sulfite waste liquor preparations are usually called "lignosulfonates", and they have in a general way the properties of salts of sulfonic acids; these acids forming soluble salts with most or all of the heavy metal bases. The lignosulfonates of these other bases form better sulfur dyes than do the lignosulfonates of lime. The actions in making and recovering the dye go forward more smoothly and the product is better. I therefore in the present invention treat the sulfite waste liquor in solution with a salt of a heavy metal with an acid capable of forming insoluble lime salts. A solution of a lignosulfonate on admixture with a solution of such a salt gives by "double decomposition" a soluble lignosulfonate which remains in solution and an insoluble precipitate of a lime salt which can be separated by decantation, filtering, filter-pressing, etc. For the present purposes, the sulfates are well adapted.

I have used aluminium sulfate, iron sulfate, zinc sulfate, copper sulfate, and many others. Each gives a specific dyestuff; and the shade and other properties of each particular preparation depend in a measure upon the particular salt used. It is not necessary to use the sulfates since many other salts, such as the oxalates, may be used. Or the oxids, hydrates or carbonates of the particular metals desired may be employed. But the sulfates are by far the most convenient salts since they are mostly soluble and give a precipitate of calcium sulfate which is easily separated.

In a specific embodiment of the present invention producing a sulfur dye containing iron, I take 100 pounds of commercial 30° Baumé concentrated sulfite waste liquor. Or I may take the corresponding amount of one of the commercial dried preparations and dissolve it in water. The liquid in either case is mixed with 10 pounds of ordinary ferrous sulfate (green vitriol) dissolved in 40 pounds of water. By a metathetical exchange, sulfate of calcium is formed and precipitates while lignosulfonate of iron in corresponding amount remains in solution. The precipitate is now separated from the liquid, which may be done by settling and decanting; by filter-pressing, etc. I thereafter concentrate the clear liquid to some extent and mingle it with salt (NaCl) or sodium sulfate. A concentrated solution of either salt may be used. For 100 parts by weight of the clear liquid made from 30° Baumé concentrated sulfite waste liquor about 30 parts by weight of sodium chlorid is usually required. While, as stated, the lignosulfonates are soluble in water, yet they are not soluble in concentrated saline solutions; and the addition of the salt to the solution therefore throws the lignosulfonate out of solution, giving a flocky or curdy precipitate which is readily filter-pressed and handled. The precipitate is separated from the mother liquor and is filter-pressed and dried. The cake is powdered and mingled with commercial sodium sulfid and sulfur, using for the precipitate from 100 pounds by weight of the original clear liquid, about 42 pounds of commercial sodium sulfid and 42 pounds of sulfur. This mixture is fused or melted at a low heat, cooled and pulverized. The mixture thus formed contains a dyestuff derived from the characteristic organic matters of sulfite waste liquor and iron, both being in union with sulfur. It is a black material soluble in water. In making a solution however it is best to use a little sodium sulfid dissolved in the water. The solution directly dyes cotton a brownish black, fast to sun and alkali. It does not directly dye wool and silk and for use with animal fibers they should be mordanted in appropriate ways.

In dyeing with this new dyestuff the cotton is simply immersed in warm or hot water solutions of the material and on being taken out and washed is of the expected color, without further treatment.

Another preparation may be made by taking the same amount of sulfite waste liquor and adding about 8 pounds of commercial crystallized aluminum sulfate. The rest of the operation is as described ante. The dye so produced colors cotton a reddish brown shade.

By using copper sulfate in the proportion of 9 pounds for every 50 pounds of dry matter contained in the sulfite waste liquor preparation a dye is obtained which colors cotton a seal brown.

By treating sulfite waste liquor solution with zinc sulfate in the proportion of 10.5 pounds crystallized commercial zinc sulfate for every 100 gallons of commercial 30° Baumé sulfite waste liquor a dye may be produced which colors cotton a gray brown.

By substituting oxalates of the metals named for the corresponding sulfates, a somewhat cleaner separation of the lime may be accomplished. The carbonates may also be used in treating sulfite liquor to remove the lime and make the desired lignosulfonates. For example, if ordinary commercial sulfite liquor of 30° Baumé be heated for a time with commercial carbonate of copper at a temperature of, say, 100° C., the calcium and magnesium of the sulfite liquor are converted into the corresponding carbonates while copper goes into solution as lignosulfonate. The solution of copper lignosulfonate may be treated in the manner described ante.

What I claim is:—

1. The process of making dyestuffs which comprises removing the calcium of sulfite waste liquor while substituting another and non-alkaline base therefor, and heating the resultant product with sulfur and an alkaline sulfid to make a sulfur dye.

2. The process of making dyestuffs which comprises treating a solution of sulfite waste preparation with a salt of a non-alkaline base with an acid forming insoluble lime salts, removing the precipitate formed and heating the resultant product with sulfur and an alkaline sulfid to make a sulfur dye.

3. The process of making dyestuffs which comprises treating a solution of sulfite waste preparation with a salt of a non-alkaline base with an acid forming insoluble lime salts, removing the precipitate formed and heating the resultant product with sulfur and sodium sulfid to make a sulfur dye.

4. The process of making dyestuffs which comprises mingling a solution of the characteristic organic matters of sulfite waste liquors with a soluble sulfate of a non-alkaline base, removing the calcium sulfate precipitated, and heating the compounds formed with sulfur and sodium sulfid to make a sulfur dye.

5. The process of making dyestuffs which comprises mingling a solution of the characteristic organic matters of sulfite waste liquors with a solution of a sulfate of a heavy metal, removing the calcium sulfate precipitated, and heating the compounds formed with sulfur and sodium sulfid to make a sulfur dye.

6. The process of making dyestuffs which comprises precipitating the lime of sulfite waste liquor with a solution of a soluble heavy metal sulfate, removing the calcium sulfate formed, precipitating out the soluble matters with a suitable salt, and heating the precipitated matter with sulfur and sodium sulfid to make a sulfur dye.

7. The process of making a sulfur dye which comprises heating a soluble lignosulfonate having a heavy metal base with sulfur and an alkaline sulfid.

8. The process of making a sulfur dye which comprises heating lignosulfonate of iron with sulfur and an alkaline sulfid.

9. The process of making sulfur dyes which comprises treating a solution containing the characteristic organic matters of sulfite waste liquor with ferrous sulfate, removing the precipitated sulfates, and heating the residue with sulfur and an alkaline sulfid.

10. The process of making a soluble sulfur dye which comprises mixing sulfite waste liquor with ferrous sulfate, separating out the precipitate formed, mixing with the remaining liquor a concentrated saline solution, separating out the precipitate formed and, after drying and powdering, heating it with sulfur and an alkaline sulfid.

11. As a new composition of matter a sulfur dye directly dyeing cotton brown and black shades being a dark powder in a dry state, soluble in water and containing the characteristic organic matters of sulfite waste liquor in union with sulfur and a heavy metal.

12. As a new composition of matter a sulfur dye containing a lignosulfonate of a heavy metal in union with sulfur, being a dark powder when in the dry state, soluble in water, and directly dyeing cotton.

13. As a new composition of matter a sulfur dye containing lignosulfonate of iron in union with sulfur.

In testimony whereof, I affix my signature.

JACOB S. ROBESON.